US011268603B2

United States Patent
Thielen

(10) Patent No.: US 11,268,603 B2
(45) Date of Patent: Mar. 8, 2022

(54) HARMONIC DRIVE

(71) Applicant: Schaeffler Technologies AG & Co. KG, Herzogenaurach (DE)

(72) Inventor: Jochen Thielen, Nuremberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 975 days.

(21) Appl. No.: 15/774,428

(22) PCT Filed: Nov. 21, 2016

(86) PCT No.: PCT/DE2016/200529
§ 371 (c)(1),
(2) Date: May 8, 2018

(87) PCT Pub. No.: WO2017/092743
PCT Pub. Date: Jun. 8, 2017

(65) Prior Publication Data
US 2018/0320771 A1    Nov. 8, 2018

(30) Foreign Application Priority Data
Dec. 1, 2015 (DE) .......................... 202015009214.4

(51) Int. Cl.
*F16H 49/00* (2006.01)
*F01L 1/352* (2006.01)

(52) U.S. Cl.
CPC ............ *F16H 49/001* (2013.01); *F01L 1/352* (2013.01); *F01L 2001/3521* (2013.01); *F01L 2250/02* (2013.01); *F01L 2250/04* (2013.01); *F01L 2250/06* (2013.01); *F01L 2820/01* (2013.01); *F01L 2820/02* (2013.01); *F01L 2820/032* (2013.01); *F16H 2049/003* (2013.01)

(58) Field of Classification Search
CPC ...................................... F16H 49/001
USPC ............................................. 74/640
See application file for complete search history.

(56) References Cited

U.S. PATENT DOCUMENTS

| 5,417,186 | A | * | 5/1995 | Elrod | .................. | F01L 13/0057 |
|---|---|---|---|---|---|---|
| | | | | | | 123/90.17 |
| 6,155,220 | A | | 12/2000 | Marriott | | |
| 6,257,186 | B1 | | 7/2001 | Heer | | |
| 6,328,006 | B1 | * | 12/2001 | Heer | ......................... | F01L 1/34 |
| | | | | | | 123/90.11 |
| 7,673,598 | B2 | * | 3/2010 | Schaefer | ................. | F01L 1/352 |
| | | | | | | 123/90.15 |
| 9,920,660 | B2 | | 3/2018 | Kohrs et al. | | |

(Continued)

FOREIGN PATENT DOCUMENTS

| DE | 10045054 | 4/2001 |
|---|---|---|
| DE | 10122660 | 11/2002 |
| DE | 102007049072 | 4/2009 |

(Continued)

*Primary Examiner* — Ha Dinh Ho
(74) *Attorney, Agent, or Firm* — Volpe Koenig

(57) ABSTRACT

A harmonic drive (1), including a wave generator (8), a flexible, externally toothed gear component (14), in particular in the form of a flex ring, which can be deformed by said wave generator, and at least one internally toothed gear component (4, 5) that meshes with the flexible, externally toothed gear component (14). The flexible, externally toothed gear component (14) has a non-circular basic shape in relation to its mechanically non-loaded state.

14 Claims, 3 Drawing Sheets

(56) References Cited

U.S. PATENT DOCUMENTS

2008/0210182 A1    9/2008  Schaefer et al.
2016/0251986 A1*   9/2016  Koh ........................ F01L 1/352
                                                          123/90.15

FOREIGN PATENT DOCUMENTS

| DE | 102013220220 | 4/2015 |
| DE | 102014202060 | 8/2015 |
| EP | 1039100 | 9/2000 |
| WO | 2005080757 | 9/2005 |

* cited by examiner

HARMONIC DRIVE

BACKGROUND

The invention relates to a harmonic drive, comprising a wave generator as well as a flexible, externally toothed gear component, in particular in the form of a flex ring, with the flexible, externally toothed gear component engaging at least one internally toothed gear component, which is typically inherently rigid.

Such a harmonic drive is known, for example, from DE 10 2014 202 060 A1. This represents a component of an electric camshaft adjuster. A setting shaft, which drives a wave generator of the harmonic drive, shows several preferred settings.

Another electric camshaft adjuster is known, for example, from DE 10 2007 049 072 A1, which also operates with a harmonic drive. The harmonic drive can be actuated by a servomotor via a self-aligning coupling, namely an Oldham-coupling. DE 101 22 660 A1 shows a harmonic drive with a flex sleeve, which is not inherently rigid, but partially sags due to gravity.

SUMMARY

The invention is based on the objective of providing a harmonic drive modified in reference to prior art, which is particularly suitable for the use in an electric camshaft adjuster as well as a device for adjusting the compression ratios of an internal combustion engine.

This objective is attained by a harmonic drive with one or more features of the invention. This harmonic drive comprises in its basic structure, known per se, a wave generator as well as a flexible, externally toothed gear component, which can be deformed by a wave generator, which gear component may represent a flex ring or a flex cup. In any case the flexible, externally toothed gear component engages at least one internally toothed gear component, which may also show a ring form or a cup form. The flexible, externally toothed gear component is distinguished from prior art such that, in reference to its mechanically unstressed state, it shows an out-of-round basic shape. Unlike flex rings or flex cups, which are circular in their mechanically unstressed state, the spring energy, which is stored in the flexible, externally toothed gear component of the harmonic drive according to the invention, is subject to permanent fluctuations during the operation of the wave generator. These fluctuations of the stored spring energy are suitable to improve the control of the harmonic drive, as explained in greater detail in the following. The convex basic shape ensures that the externally toothed gear component can also store the actual spring energy without here any local overstress developing. Additionally, such an annular, closed gear component can be easily produced.

The stored spring energy of a flexible gear component according to the invention, installed in a harmonic drive, is therefore dependent on the angular position. The flexible gear component strives here to distort into a certain preferred position. This feature generates a snap moment. According to the invention it is provided in one embodiment to use the snap moment in order to keep the wave generator of the harmonic drive in a certain preferred position. This way the energy required for holding a certain angular position is reduced, because the self-aligning torque of the system can be exploited. In case of a high transmission ratio the snap moment may be sufficient perhaps to generate a proper inherent inhibition of the transmission, which is strong enough that no additional holding torque needs to be applied by the wave generator. The externally required energy drops the further the longer the system is operated at constant angular positions.

In one embodiment the flexible, externally toothed gear component exhibits the form of a polygon. The corners of the polygon are generally rounded in order to keep the stress in the material below a required threshold. In a preferred embodiment such a polygon is a regular polygon.

In a preferred embodiment the flexible, externally toothed gear component exhibits an elliptic basic form, thus the spring energy stored in the gear component shows two minima and two maxima in one full rotation of the wave generator. As long as no external force is applied upon the flexible, externally toothed gear component it therefore exhibits a form, which is similar to the shape of a rigid, elliptic gear component of the wave generator. The rigid, elliptic component may represent particularly an internal ring of a roller bearing, particularly a ball bearing. The ratio between the semi-axes of the rigid elliptic component of the wave generator is not necessarily identical to the ratio of one of the semi-axes of the flexible, also elliptical gear component.

Preferably the flexible, elliptical gear component is designed such that during rotation of the wave generator it always remains in a mechanically stressed state, with the degree of mechanical stress and thus the stored spring energy depending on the angular position of an adjustment shaft, which drives the wave generator. The spring energy stored in the flexible, externally toothed gear component is minimal when the large semi-axis of this gear component in reference to the form of the gear component coincides with the large semi-axis of the rigid, elliptical component of the harmonic drive in the non-installed state, i.e. not deformed by the harmonic drive. Similarly, the spring energy stored in the flexible, externally toothed gear component is maximal when its large semi-axis is aligned in the direction of the small semi-axis of the rigid, elliptical component of the wave generator. When the large semi-axes and thus also the small semi-axes of the flexible, externally toothed gear component, particularly the flex ring, on the one side and the rigid elliptical component, particularly the internal ring, of the wave generator on the other side are identically aligned, here a stable equilibrium is given. At a state of the wave generator rotated by 90°, in which respectively one large semi-axis and one small semi-axis of the two above-mentioned parts are coinciding, here an instable equilibrium is given, though.

The transmission of the harmonic drive is preferably selected such that a transition is given between one stable equilibrium and the next stable equilibrium within the required control quality, stated for example in degrees of angular minutes. The transmission ratio of a harmonic drive results from the teeth count of the external teeth of the flexible gear component and the teeth count of the internal teeth of the rigid gear component engaging them, which are different from each other. Typically the teeth count of the external teeth is lower by two than the teeth count of the engaging internal teeth.

For example, the flexible, externally toothed gear component exhibits 180 teeth, while the rigid, internally toothed gear component exhibits 182 teeth. In one full revolution of the wave generator the rigid, internally toothed gear component is rotated by two teeth, which is equivalent to a transmission ratio of 90:1. Due to the fact that the angular distance between two teeth in this case amounts to two degrees, here a rotation by two teeth is equivalent to a rotation of 4°. A 90° rotation of the adjuster shaft of the wave generator is therefore coinciding with a rotation of the rigid, internally toothed gear component by 1°. The internally toothed, rigid gear component is identical to a driven element of the harmonic drive or connected fixed thereto. When this driven element is to be adjusted with a precision of ±1°, here at a given transfer ratio of the harmonic drive of 90:1 a stable condition must be approached within an interval of ±90° of the actuator shaft of the harmonic drive. At least one such stable state exists within this interval of ±90°, in reference to the adjuster shaft of the wave generator, and thus also the circumference of the flexible, externally toothed gear component.

If a setting accuracy of the driven element of the harmonic drive is demanded within ±1.5°, here a transmission ratio of 60:1 is sufficient in order to realize any desired angular position of the driven element with a minimum of the spring energy stored in the flexible gear component.

In general, the following connection is given between the transmission ratio of the harmonic drive, marked I, and the degree of the explicitly demanded control quality in reference to the angular position of the driven shaft.

I≥90/r

The energy minima of the flexible gear component correspond to preferred positions of the harmonic drive, which is preferably used as a control gear. In a preferred embodiment the spring pre-load of the out-of-round gear component is strong enough to result in an automatic approach of the preferred positions, for illustration purposes also called snapping. Compared to harmonic drives of prior art, the preferred positions cannot only be held precisely but also with particularly low energy consumption, particularly without consuming any energy at all.

The difference between the maximum and the minimum spring energy, which is stored during operation of the harmonic drive in the flexible, externally toothed gear component, is in a preferred embodiment greater than the minimum spring energy stored in the flexible gear component. The harmonic drive is preferably embodied as a self-inhibiting transmission, as is also the case in harmonic drives of prior art. This means that no adjustment of the adjuster shaft of the wave generator is possible by distorting the driven element of the harmonic drive. This is based on the concept that any additional shaft, typically one fixed to the housing, is in principle fixed as a harmonic drive designed as a three-shaft transmission. During actual operation of the harmonic drive either two shafts are rotating, namely the adjuster shaft operating the harmonic drive, and the driven shaft, or all three shafts, with in this case the driven shaft rotating with the speed of the additional shaft, as long as the adjuster shaft also rotates with said speed. In the first case (precisely two rotating shafts) for example a device is given to adjust the compression ratio of a reciprocating piston engine, while in the second case particularly an electric camshaft adjuster is given.

In general, the harmonic drive is suitable to fix a driven shaft with little effort with regards to a torque to be introduced into the adjustment shaft. In the following, effects for self-inhibition are not considered, for reason of simplification.

A transmission ratio of the harmonic drive amounting to 50:1 is assumed. The driven shaft is assumed to be fixed at a torque of 50 Nm. Here, out-of-roundness of the flexible, externally toothed gear component, which ensures a snapping torque of at least 1 Nm, is in this case sufficient for reliably fixing the driven shaft. The adjustment motor is not required to generate any torque. In fact, based on the given self-inhibition of the gear component even a minor snapping torque of the flexible, externally toothed gear component is sufficient.

BRIEF DESCRIPTION OF THE DRAWINGS

In the following, an exemplary embodiment of the invention is explained based on a drawings. Shown here are.

DETAILED DESCRIPTION

Figure 1:
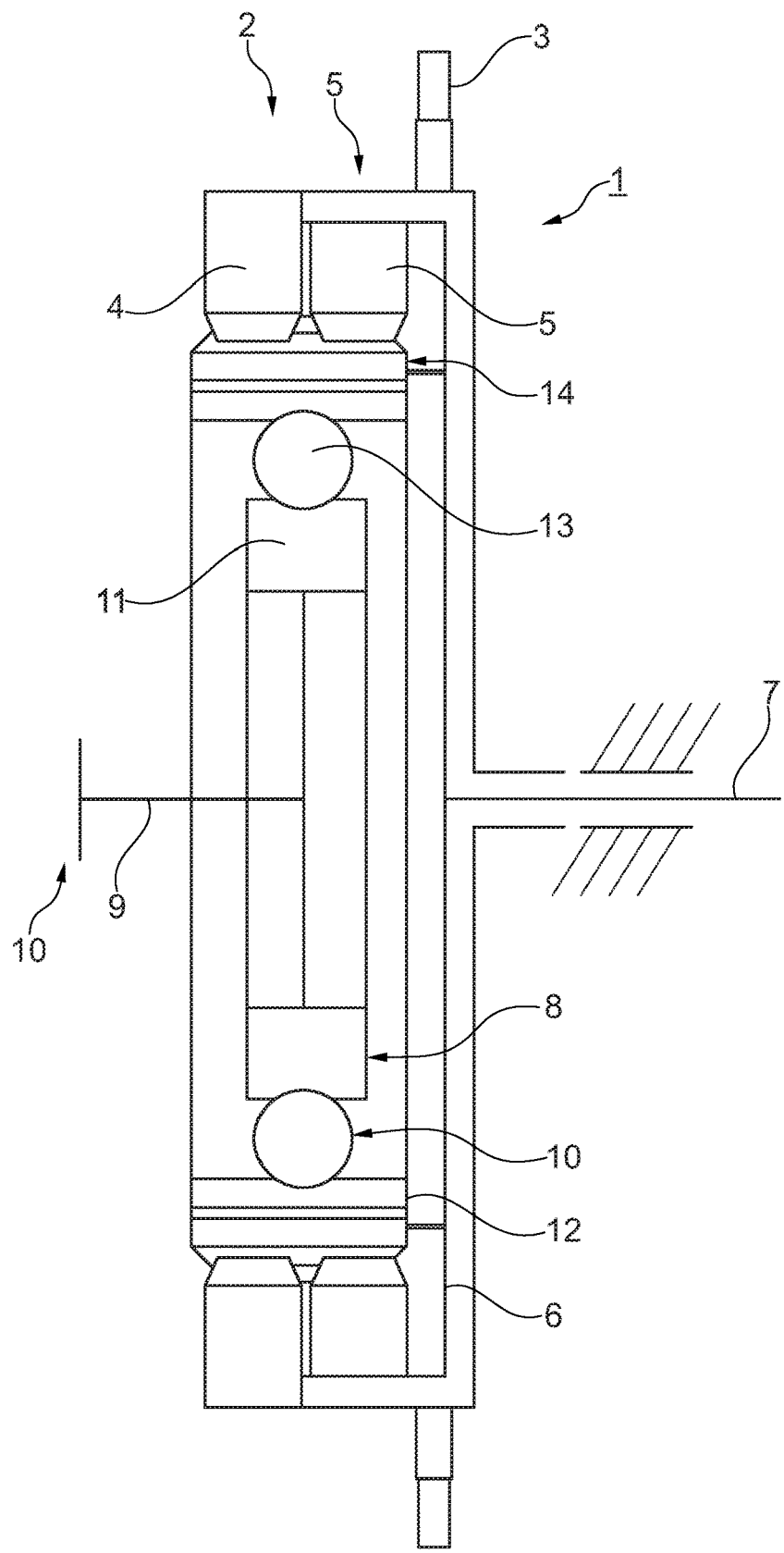
FIG. 1 a harmonic drive in a symbolized cross-section.

FIG. 1 shows a sketch of the design of a harmonic drive, marked with the reference character 1 in its entirety, with here reference being made to prior art with regards to its principle function.

The harmonic drive 1 comprises a housing 2, which is connected fixed to the drive wheel 3. The drive wheel 3 can be driven, for example by a traction mechanism or a sprocket. Additionally, a drive sprocket 4 is connected to the housing 2 as a gear component, which includes internal teeth. In addition to the drive sprocket 4, a driven component 5 is provided as another gear component, which also exhibits internal teeth and is coupled fixed via a driven wheel 6 to a driven shaft 7.

A wave generator 8 is located radially inside the two gear components 4, 5 with internal teeth, which is driven by an adjustment shaft 9. The adjustment shaft 9 is coupled via a self-aligning coupling 10 to a servomotor, particularly an electric motor, not shown. The internal ring 11 of the wave generator 8 shows a stiff, elliptic form. A resilient external ring 12 of the wave generator 8 adjusts permanently to the elliptic form of the internal ring 11 during the rotation of the adjustment shaft 9, with balls 13 rolling as roller bodies between the internal ring 11 and the external ring 12.

A flexible, externally toothed transmission element 14, namely a flex ring, is located directly around the external ring 12. During the rotation of the adjustment shaft 9 of the wave generator 8 the flex ring 14 permanently assumes the form of the external ring 12. Here, the external teeth of the flex ring 14 are made to engage the internal teeth of the gear components 4, 5 at two diametrically opposite points. By slightly different teeth counts of the above-mentioned gear components 4, 5, 14 a high transmission ratio is given of the harmonic drive 1, in the present case a transmission ratio of 90:1.

Figure 2:
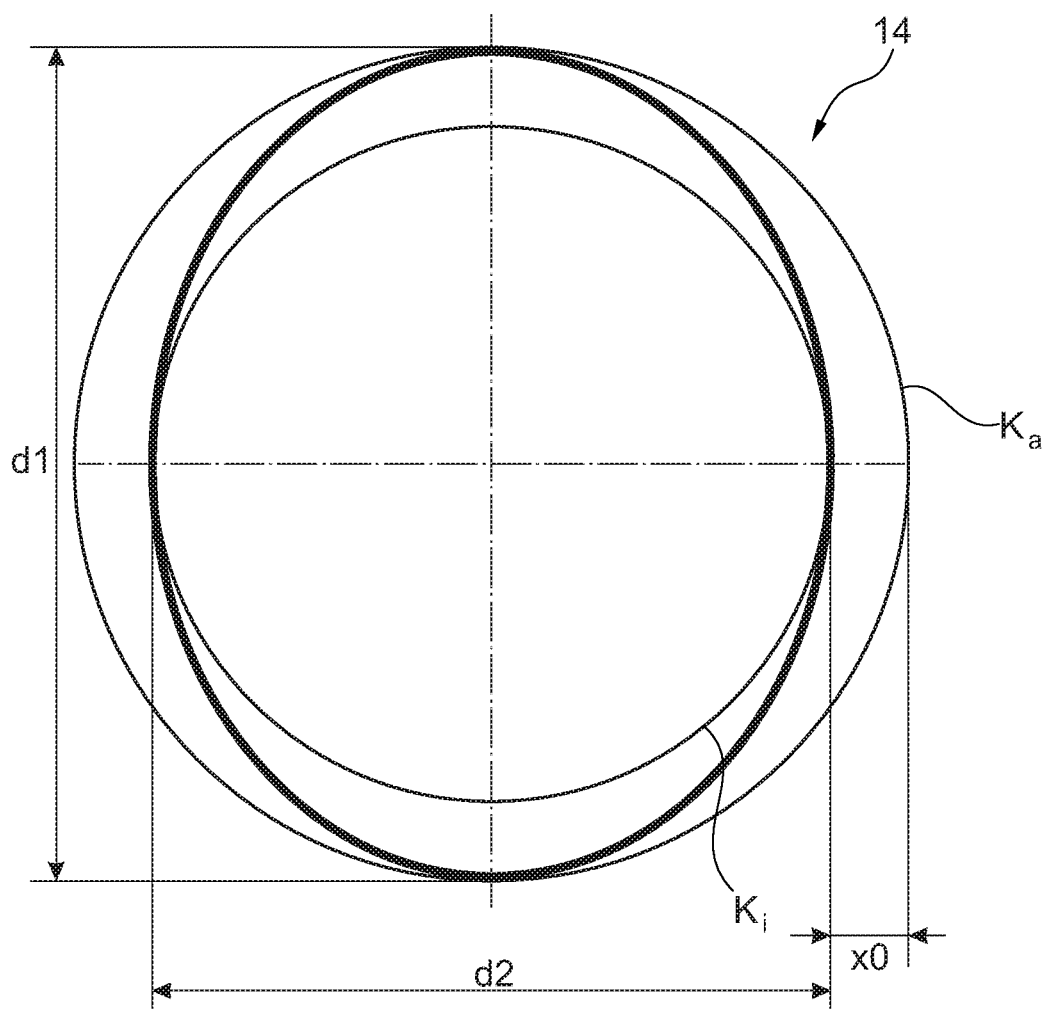
FIG. 2 states of a flexible gear component of the harmonic drive.

In FIG. 2 the form of the flex ring 14 is sketched in the mechanically unstressed state, i.e. here the harmonic drive 1 is not installed. A first external dimension d1 is given along the large semi-axes, a second external dimension d2 along the small semi-axes. Circles tangent to the flex ring 14 at the respective points, are identified as external circle $K_a$ and as internal circle $K_i$. The difference of the semi-axes of the flex ring 14 marked x0 is equivalent to the difference between the radius of the external circle $K_a$ and the radius of the internal circle $K_i$, and is also called deviation from roundness.

Figure 3:
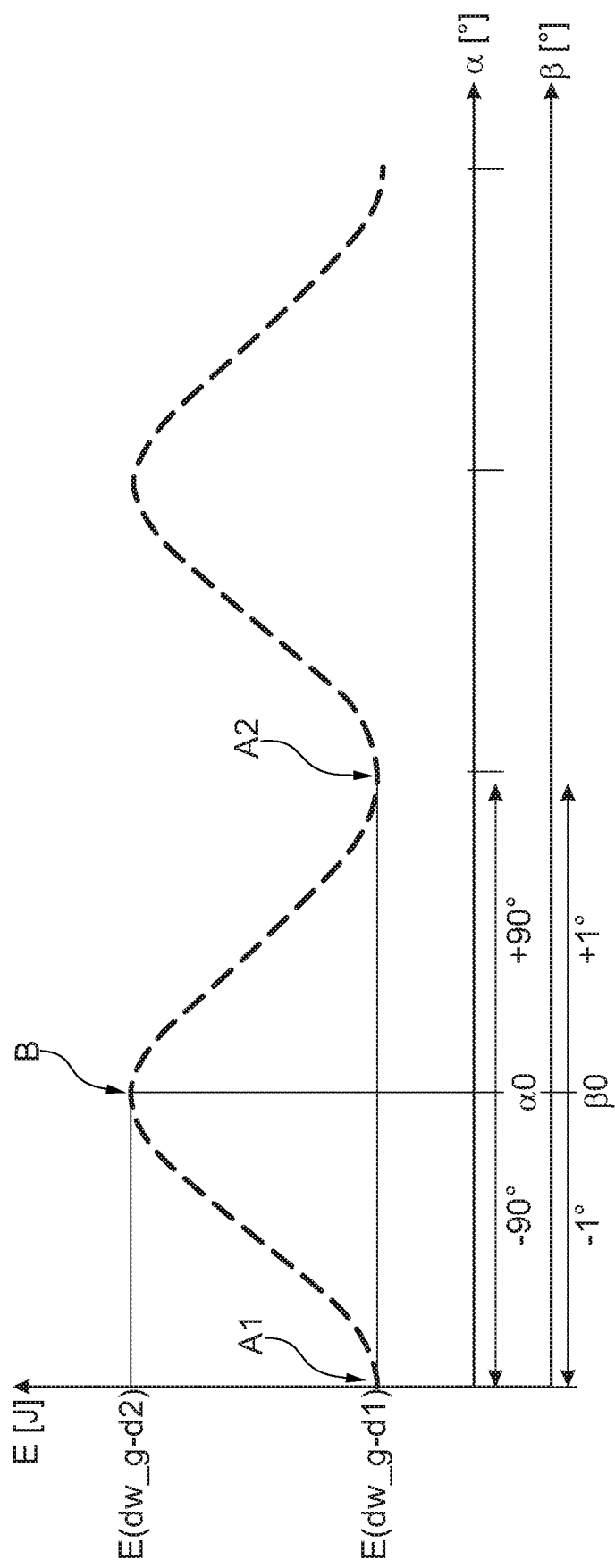
FIG. 3 status changes of the flexible gear component in the form of a diagram.

In FIG. 3 the angle of the adjustment shaft 9 is marked with α and the angle of the driven shaft 7 is marked with β. The target angle of the adjustment shaft 9 is marked with α0 and a target angle of the driven shaft 7 with β0. The energy E stated in Joule represents the spring energy stored in the flex ring 14 and dependent on the angular position of the adjustment shaft 9. As discernible from FIG. 3, the spring energy stored in the flex ring 14 is varied in a sinusoidal fashion over the rotation of the adjustment shaft 9 between a minimum value E(dw_g-d1) and a maximum value E(dw_g-d2). The minimum energy E(dw_g-d1) is then stored in the flex ring 14 when the large semi-axis of the elliptic internal ring 11 is aligned parallel to the large semi-axis of the flex ring 14 in reference to the status sketched in FIG. 2.

Conditions of minimal energy are marked A1, A2, a status of maximum energy is marked with B. In the status B the flex ring 14 is deformed maximally in reference to its mechanically unstressed form. The transition from the status B into one of the lower energy states A1, A2 is equivalent to an adjustment of the adjustment shaft 9 by ±90° as well as an adjustment of the driven shaft 7 by ±1°. At a requested setting accuracy, i.e. control quality, of the driven shaft 7 of ±1°, here always a state of minimal energy A1, A2 can be approached, with the transition being possible by exclusively using the snapping moment of the flex ring 14. In the state A1, A2 the harmonic drive 1 can be held with little energy effort, even without applying any torque upon the adjustment shaft 9.

LIST OF REFERENCE CHARACTERS
1 Harmonic drive
2 Drive element, housing
3 Drive wheel
4 Drive sprocket, gear component
5 Driven sprocket, gear component
6 Driven disk
7 Driven shaft
8 Wave generator
9 Adjustment shaft
10 Self-aligning coupling
11 Internal ring
12 External ring
13 Roller body
14 Flexible, externally toothed gear element, flex ring
αAngle of the adjustment shaft
βAngle of the driven shaft
α0 Target angle of the adjustment shaft
β0 Target angle of the driven shaft
A1, A2 States of minimal energy
B Status of maximal energy
d1, d2 External dimensions
E Stored spring energy
E(dw_g-d1) Minimum value of energy
E(dw_g-d2) Maximum value of energy
$K_a$ External circle
$K_i$ Internal circle
x0 Deviation from roundness, difference of the semi-axes

The invention claimed is:

1. A harmonic drive, comprising
a wave generator,
a flexible, externally toothed gear component that is deformable by the wave generator,
at least one internally toothed gear component engaging the flexible, externally toothed gear component, and
in an unstressed state, the flexible, externally toothed gear component comprises a convex basic shape,
wherein the flexible, externally toothed gear component has an elliptic basic form, with a spring energy (E) stored in said flexible, externally toothed gear component having two minima E(dw_g-d1) and two maxima E(dw_g-d2) per one full revolution of the flexible, externally toothed gear component.

2. The harmonic drive according to claim 1, wherein an amount of a difference between a teeth count of external teeth of the flexible gear component and a teeth count of internal teeth of the internally toothed gear component is maximally equivalent to 1/60.

3. The harmonic drive according to claim 1, wherein the spring energy at the minima E(dw_g-d1) stored in the flexible, externally toothed gear component is equivalent to less than half of the spring energy at the maxima E(d2_g-d2) stored in said gear component.

4. The harmonic drive according to claim 1, wherein the flexible, externally toothed gear component has a basic form of a polygon with rounded edges.

5. The harmonic drive according to claim 1, wherein the flexible, externally toothed gear component is a flex ring.

6. The harmonic drive according to claim 5, wherein there are two of the internally toothed gear components, and one of the two internally toothed gear components comprises a driven sprocket.

7. The harmonic drive according to claim 1, wherein the flexible, externally toothed gear component comprises a flex cup which is adapted to be a driven element.

8. A control gear of an electric camshaft adjuster or a device for adjusting a compression ratio of an internal combustion engine comprising the harmonic drive according to claim 1.

9. A method for operating a harmonic drive comprising a wave generator, a flexible, externally toothed gear component, that by the wave generator, as well as at least one internally toothed gear component that engages the flexible, externally toothed gear component, with the flexible, externally toothed gear component having an out-of-round basic form in a mechanically unstressed state, the method comprising the externally toothed gear component adjusting itself into a desired position in a period in which no relative adjustment shall occur via a spring energy (E) stored in said flexible, externally toothed gear component, and said flexible, externally toothed gear component applying an inherent holding torque that reduces a holding torque applied for driving the wave generator.

10. A harmonic drive, comprising
a wave generator adapted to be connected to an adjustment shaft,
a flexible, externally toothed gear component that is deformable by the wave generator, that in an unstressed state, comprises a convex basic shape,
a first internally toothed gear component engaging the flexible, externally toothed gear component that is adapted to be connected to a drive shaft, and
a second internally toothed gear component engaging the flexible, externally toothed gear component that is adapted to be connected to a driven shaft, and
wherein the flexible, externally toothed gear component has an elliptic basic form, with a spring energy (E) stored in said flexible, externally toothed gear component having two minima and two maxima per one full revolution of the flexible, externally toothed gear component.

11. The harmonic drive according to claim 10, wherein the spring energy at the minima stored in the flexible, externally toothed gear component is equivalent to less than half of the spring energy at the maxima.

12. The harmonic drive according to claim 10, wherein the first and second internally toothed gear components have a different number of teeth.

13. The harmonic drive according to claim 10, wherein the transmission ratio is at least 60:1.

14. The harmonic drive according to claim 10, wherein the wave generator includes an internal ring, an external ring on which the flexible, externally toothed gear component is located, and roller bodies located between the internal and external rings.

* * * * *